(12) United States Patent
Pawar et al.

(10) Patent No.: US 11,570,294 B1
(45) Date of Patent: *Jan. 31, 2023

(54) ENHANCED INCOMING CALL NOTIFICATIONS

(71) Applicant: T-Mobile Innovations LLC, Overland Park, KS (US)

(72) Inventors: Sadanand Pawar, Overland Park, KS (US); Hemant Tiwari, Overland Park, KS (US); Navaneeth Godalwar, Kansas City, MO (US); Jason B. Marshall, Olathe, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/230,217

(22) Filed: Apr. 14, 2021

Related U.S. Application Data (63) Continuation of application No. 16/721,266, filed on Dec. 19, 2019, now Pat. No. 11,019,198.

(60) Provisional application No. 62/938,032, filed on Nov. 20, 2019.

(51) Int. Cl.
| | |
|---|---|
| *H04M 1/72475* | (2021.01) |
| *H04M 11/00* | (2006.01) |
| *H04M 1/72436* | (2021.01) |
| *H04L 65/1063* | (2022.01) |
| *H04M 3/42* | (2006.01) |
| *H04L 65/1096* | (2022.01) |
| *H04L 65/1069* | (2022.01) |
| *H04L 65/1045* | (2022.01) |

(52) U.S. Cl.
CPC .... *H04M 1/72475* (2021.01); *H04L 65/1045* (2022.05); *H04L 65/1063* (2013.01); *H04L 65/1069* (2013.01); *H04L 65/1096* (2013.01); *H04M 1/72436* (2021.01); *H04M 3/42042* (2013.01)

(58) Field of Classification Search
None
See application file for complete search history.

(56) References Cited

U.S. PATENT DOCUMENTS

| | | | |
|---|---|---|---|
| 6,914,964 B1 | 7/2005 | Levine | |
| 10,129,395 B1 * | 11/2018 | Maxwell | H04M 3/42042 |
| 11,019,198 B1 * | 5/2021 | Pawar | H04M 3/42042 |
| 2006/0026001 A1 | 2/2006 | Bravin et al. | |

(Continued)

*Primary Examiner* — Quoc D Tran
(74) *Attorney, Agent, or Firm* — Shook, Hardy and Bacon LLP (57) ABSTRACT

Methods and systems are provided for providing enhanced incoming call notifications for users who utilized a relay application designed for those with speech, visual, or hearing impairments or disabilities. An indication that a calling party is attempting to initiate an incoming call intended for a receiving party that utilizes a relay application that assists users having hearing, visual, or speech disabilities is received by an intermediate party. A chat session is established utilizing the relay application between the intermediate party and the calling party. Additionally, a Voice over Internet Protocol (VoIP) session is established that does not include a voice session. Upon the chat session being terminated from within the relay application, the VoIP session is terminated.

20 Claims, 8 Drawing Sheets

(56) References Cited

U.S. PATENT DOCUMENTS

| | | | |
|---|---|---|---|
| 2009/0028300 A1* | 1/2009 | McLaughlin | H04M 3/42391 |
| | | | 379/52 |
| 2010/0222098 A1* | 9/2010 | Garg | H04M 1/72478 |
| | | | 704/235 |
| 2018/0131900 A1 | 5/2018 | Talbot | |
| 2018/0253992 A1* | 9/2018 | Koul | H04M 3/42391 |
| 2019/0208166 A1 | 7/2019 | Talbot | |

* cited by examiner

ENHANCED INCOMING CALL NOTIFICATIONS

CROSS-REFERENCE TO RELATED APPLICATIONS

This U.S. application Ser. No. 17/230,217 filed on Apr. 14, 2021, and entitled "Enhanced Incoming Call Notifications" is a Continuation of U.S. application Ser. No. 16/721,266 filed on Dec. 19, 2019, and entitled "Enhanced Incoming Call Notifications," which in turn claims the benefit of priority to U.S. Provisional Application No. 62/938,032 filed on Nov. 20, 2019, and entitled "Enhanced Incoming Call Notifications." The entireties of the aforementioned applications are incorporated by reference herein.

SUMMARY

The present disclosure is directed, in part, to providing enhanced and improved notifications to users who utilize a relay application intended for those with speech, hearing, and vision disabilities. When a calling party initiates a call to a receiving party, an intermediate party, typically associated with a carrier, receiving the incoming call and identifies the receiving party, or the party to whom the call is intended. A Voice over Internet Protocol (VoIP) session is them established between the calling party and the receiving party. The use of a VoIP session causes an improved and enhanced notification to be displayed on the user device of the receiving party as the receiving party is being notified of an incoming call. Additionally, a priority-based notification may be used, such as through a server of the user device's operating system, so that the receiving party receives the incoming call notification in real-time or near real-time. Once the receiving party accepts the call, a chat session is initiated through the relay application used by the receiving party or the calling party. While the VoIP session continues until the chat session has been terminated, a voice or audio session is not established, as communications between the parties occur through the chat session.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Generally, aspects are provided herein for enhancing and improving notifications displayed on a user device of a user who utilizes and/or subscribes to a relay application, such as an application designed for those with a hearing, speech, and/or visual disability. Relay applications allow for a user with one or more of these disabilities to effectively communicate with others, whether or not the other person utilizes or subscribes to the relay application.

Typically, relay applications use standard notification systems such that the notifications provided to the receiving party of a call, where that receiving party utilizes the relay application, provided only a short period of time for the receiving party to accept or decline the call. In these scenarios, once the user has accepted, declined, or not answered the incoming call, an indication of the call is not displayed in the user device's call log, but instead may be provided as a notification, such as within a notification center of the user device. As such, the call is treated only as a call that is received through the relay application, and the provided notifications can easily be missed by the user. Because a standard notification system is used, the receiving party may not even be presented with an incoming call notification until after the call has been terminated, such as for the receiving party not answering the call within the allotted time. This is because priority notifications are prioritized by the server, and other notifications from applications, such as those through a relay application, are handled after the priority notifications.

To improve on the current notifications, aspects include utilizing a priority-based notification system, which, through a server associated with the operating system of the receiving party's user device, ensures that incoming call notifications are received in real-time or near real-time. Additionally, VoIP technology is utilized. While we refer to the enhanced call notifications as being used for the receiving party, similar types of notifications would be displayed if the calling party instead was the party using the relay application for a speech, hearing, and/or vision disability. Instead of simply establishing a chat session between the calling and receiving parties, where one of the parties utilizes a relay application, here, a VoIP session is additionally created to provide enhanced and improved incoming call and other notifications to the user. Even more than the incoming call notifications, a call log, such as a missed call log, incoming call log, etc., of the user device would now include an indication of the call, which is now possible since a VoIP session has been established. Even though a VoIP session is established, it is noted that an audio or voice session is not established, as communications between the calling and receiving parties in aspects provided herein take place through the chat session, which is hosted within the relay application. Once the chat session is terminated, the VoIP session is also terminated. But the VoIP session persists throughout the call between the calling and receiving parties. Another reason for utilizing a VoIP session is that if a second or otherwise subsequent call is received by the receiving party while the receiving party is in a chat and VoIP session with the first calling party, the receiving party would have the option to continue with the current call, or switch to the new call, as would be the case if one of the parties were not utilizing the relay application, as described herein.

In a first aspect, one or more computer-readable media having computer-executable instructions embodied thereon are provided that, when executed, perform a method for enhancing notifications associated with an incoming call. The method includes receiving, from an intermediate party, an indication that a calling party is attempting to initiate an incoming call intended for a receiving party that utilizes a relay application that assists users having hearing, visual, or speech disabilities, and establishing a chat session utilizing the relay application between the intermediate party and the calling party. The method further includes establishing a Voice over Internet Protocol (VoIP) session that does not include a voice session, and upon the chat session being terminated from within the relay application, disconnecting the VoIP session.

In a second aspect, a method is provided for enhancing notifications associated with an incoming call. The method includes receiving, at an intermediate party, an indication that a calling party is attempting to call a receiving party; and subsequent to receiving the indication, establishing a VoIP session between the calling party and the receiving party, wherein the VoIP session includes a chat session but does not include a voice session, and wherein the chat session is established using a relay application for users with a hearing, vision, or speech disability. Further, the method includes receiving an indication that the calling party has accepted an incoming call associated with the VoIP session, and continuing the VoIP session until the chat session has been disconnected.

In a third aspect, a system is provided for enhancing notifications associated with an incoming call. The system includes a processor and one or more computer storage hardware devices storing computer-usable instructions that, when used by the processor, cause the processor to perform a method. The method includes, upon receiving an indication from a calling party to establish a chat session with a receiving party, establishing a VoIP session between the calling party and the receiving party, wherein the VoIP session includes a chat session but does not include a voice session, and wherein the chat session is established using a relay application for users with a hearing, vision, or speech disability. Further, the method includes receiving an indication that the receiving party has declined an incoming call associated with the VoIP session or a threshold of time for the notification to appear on a user device associated with the receiving party has expired, and disconnecting the chat session between the calling party and the receiving party.

Throughout the description herein, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention.

Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
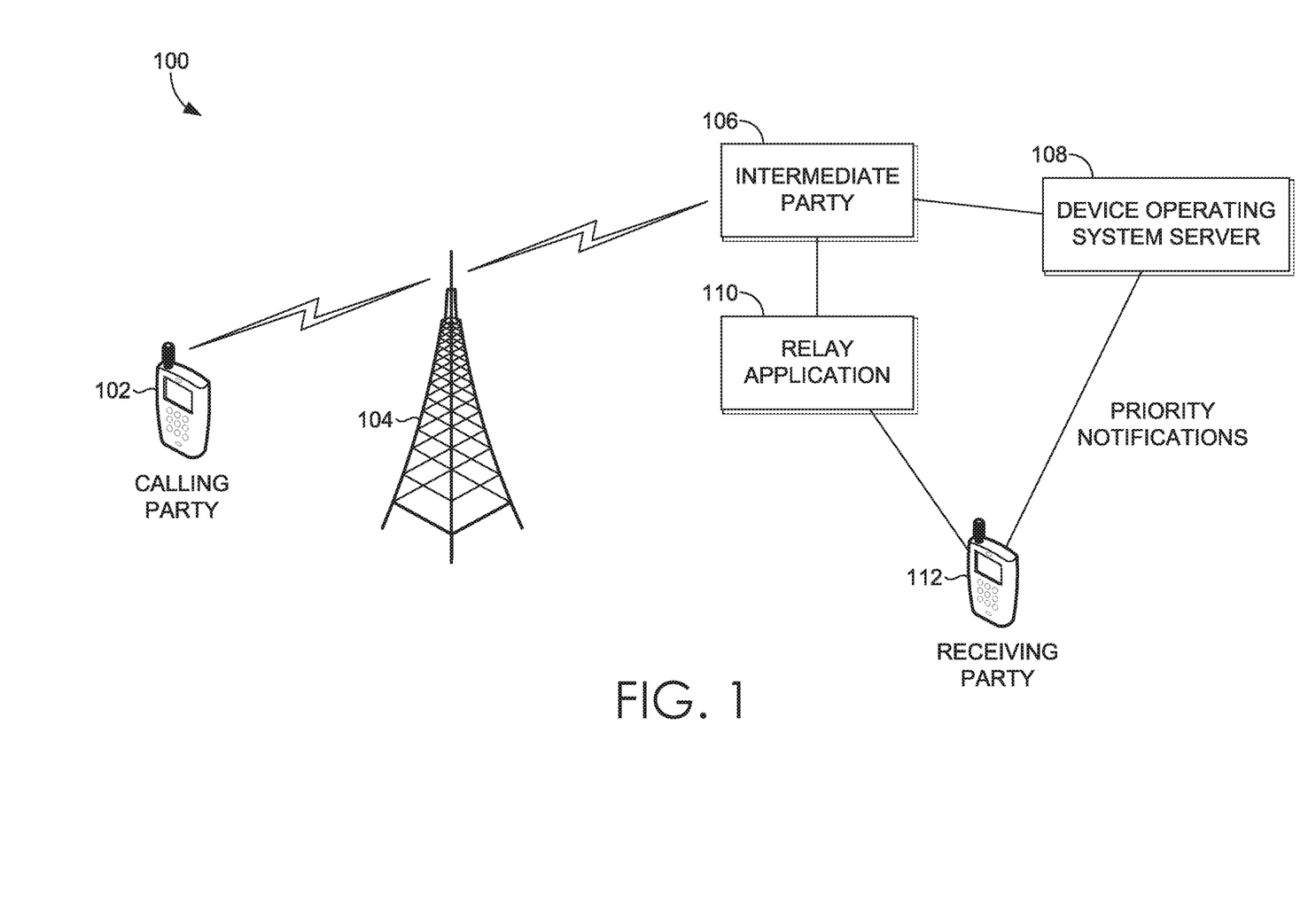
FIG. 1 depicts a diagram of an exemplary network environment suitable for use in implementations of the present disclosure.

Referring to FIG. 1, an exemplary network environment is provided in which implementations of the present disclosure may be employed. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

FIG. 1 illustrates a calling party 102, which may initiate a call with receiving party 112. In aspects, calling party 102 communicates through a wireless communications network, through cell site 104, to an intermediate party 106. Intermediate party 106 is typically associated with the wireless communications network, and may be a network operator, for example. Intermediate party 106 is generally responsible for establishing a VoIP session and a chat session. The chat session is initiated within relay application 110, which, in the aspect of this FIG. 1, is being utilized by receiving party 112. Intermediate party 106 communicates with the device operating system server 108, also termed a second intermediate party herein, to provide a notification to receiving party 112 of the incoming call. The notifications used herein are priority-based notifications instead of regular push notifications, meaning that the receiving party 112 will receive incoming call notifications in real-time or near real-time. In some aspects, device operating system server 108 is associated with the operating system (e.g., iOS, Android) of receiving party's 112 device.

As shown, calling party 102 includes a communication link to the cell site 104. Communications links, such as the wireless telecommunication links shown in FIG. 1 between user device and cell site 104, may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short-range and long-range as different categories, or types, of connections (i.e., a primary connection and a secondary connection). A short-range connection may include a Wi-Fi connection to a device (e.g., mobile hotspot) that provides access to a communications network, such as a WLAN connection using 802.11 protocol. A short-range connection may also utilize mobile broadband, which provides wireless Internet access using a mobile broadband router. One example of mobile broadband technology is Evolution Data Optimized, or EVDO. EVDO relies on a signal from a wireless tower rather than a physical connection like a phone line or cable. An EVDO modem receives the signal and allows a user to connect to the Internet. Another example of mobile broadband is HSPA. A long-range connection may include a connection using one or more of CDMA, GPRS, GSM, TDMA, 802.16, and the like.

In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices. In some aspects, user devices 102 and 112 can correspond to computing device 800 in FIG. 8. Thus, a user device can include, for example, a display(s), a power source(s) (e.g., a battery), a data store(s), a speaker(s), memory, a buffer(s), a radio(s), and the like. In some implementations, calling party 102 or receiving party 112 may comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

Figure 2:
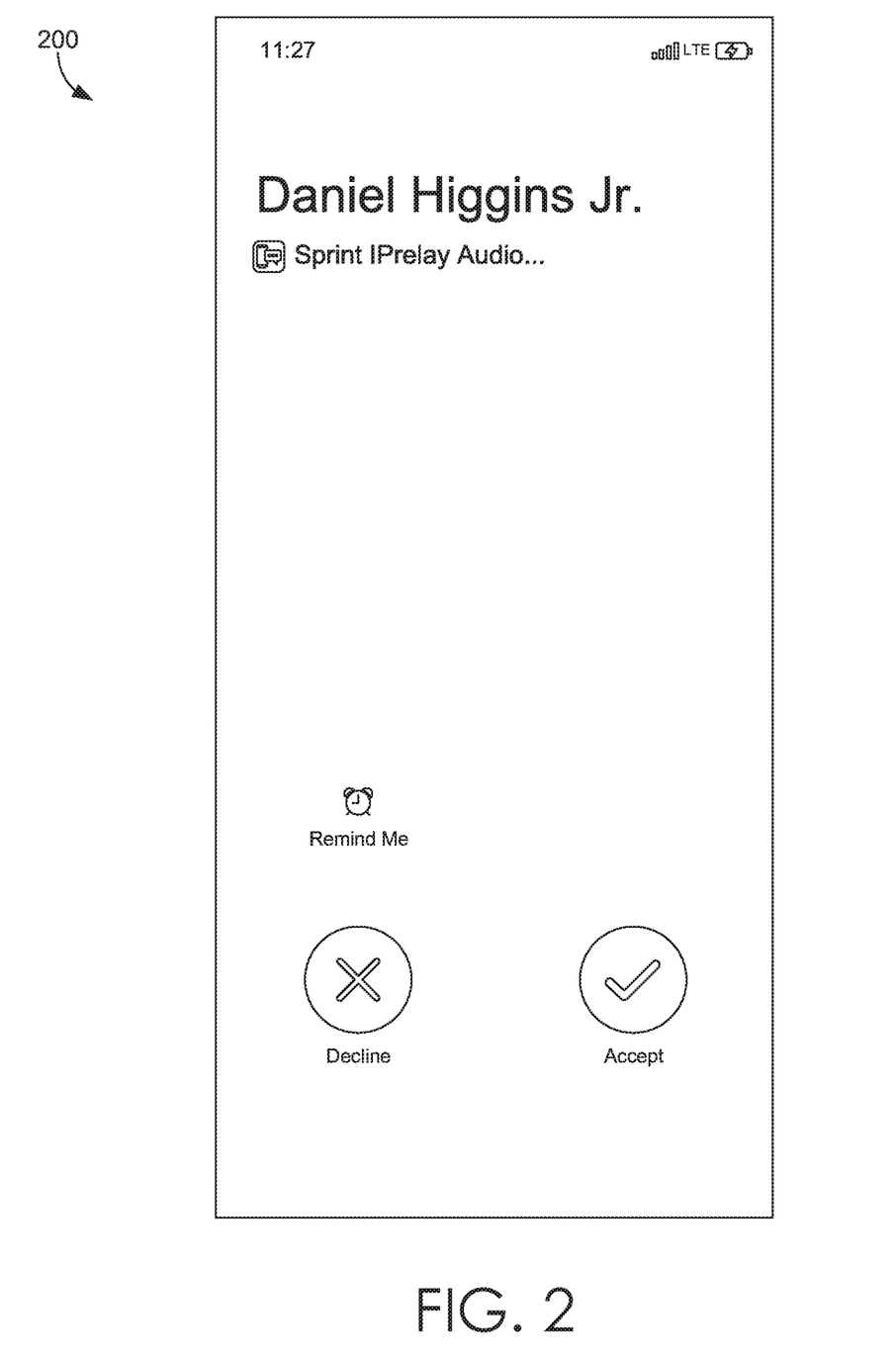
FIGS. 2-7 each depict a screenshot associated with enhanced notifications when a relay application is utilized, in accordance with aspects of the present disclosure.

FIGS. 2-7 are screenshots of users utilizing the relay application. Starting initially with FIG. 2, FIG. 2 illustrates a screenshot 200 of an incoming call notification, such as when a phone is unlocked, as may be received by a receiving party. As discussed, this enhanced notification of an incoming call is available because a VoIP session has been established between the parties, even though for communications purposes, only a chat session is utilized. Without the use of VoIP and a priority-based notification system, this incoming call notification may not be provided to the user device in real-time, and could even not be displayed until after the call has ended. While the incoming call notification of FIG. 2 may look like a standard notification to some, when a relay application is utilized to connect a calling party and a receiving party (who may utilize the relay application because of a vision, hearing, and/or speech disability), there would typically not be a need for a voice/audio session, and as such, this type of notification would not be presented to the receiving party to accept or decline a call. Instead of being initiated by a device operating system server (e.g., Android, iOS), as is the case with the notification of FIG. 2, the standard call notification would come from the relay application, and does not look like a call notification when voice/audio is being utilized between the parties. Another advantage of establishing a VoIP session even though the parties do not communicate using a voice/audio session is that the party utilizing the relay application is able to minimize the call window, which then causes a ribbon or bar on the display that allows the user to go back to the call screen at any time.

Figure 3:
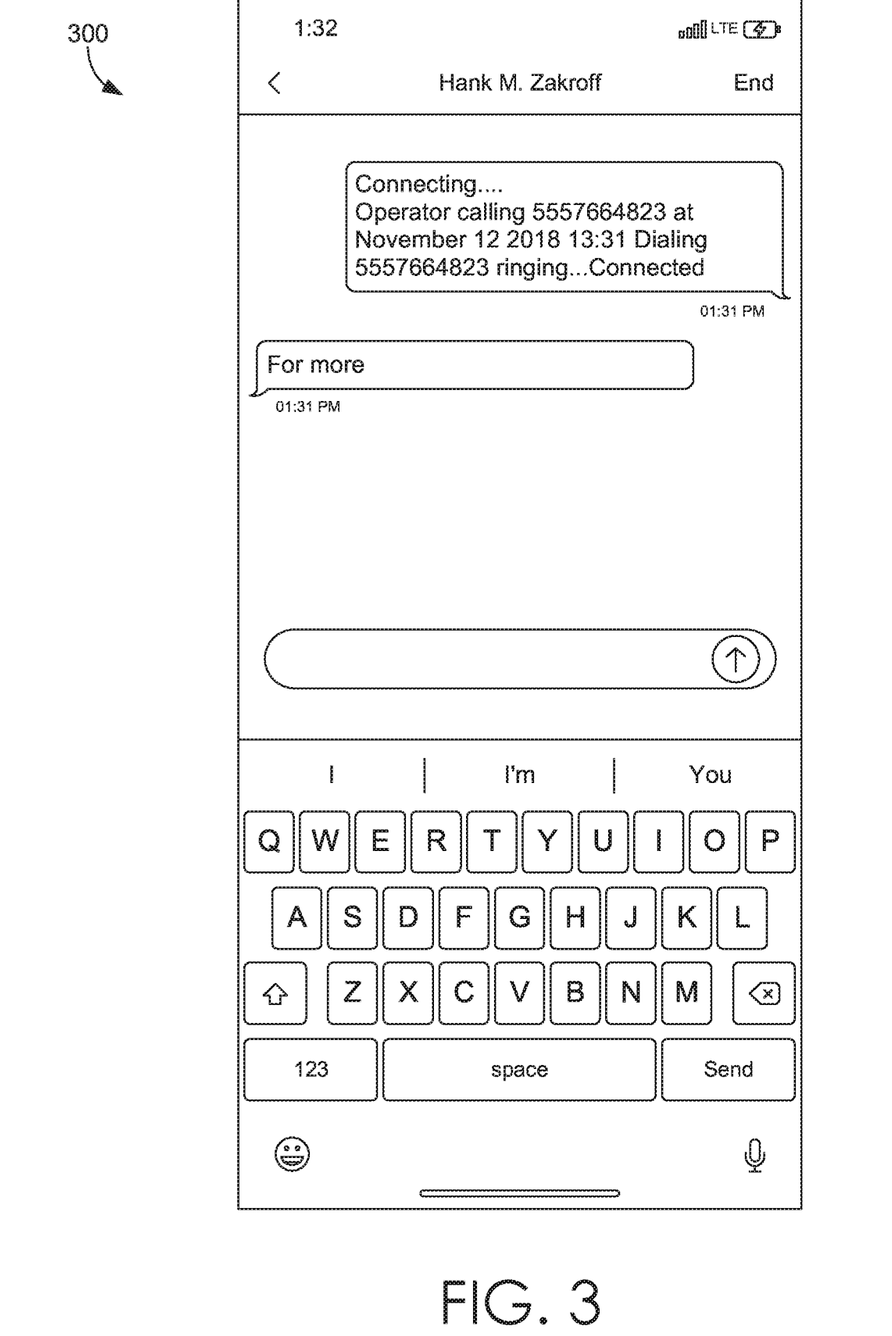

FIG. 3 illustrates a screen shot 300 of an initial chat session between the calling party and the intermediate party, which, as shown here, indicates to the calling party that the operator is attempting to connect with the receiving party. In some aspects, the calling party, to initiate a call with the receiving party, does not actually call a phone number associated with the receiving party if the receiving party is the one using the relay application, but instead calls a number associated with the relay application/system. Then, the system/operator calls the number associated with the receiving party.

Figure 4:
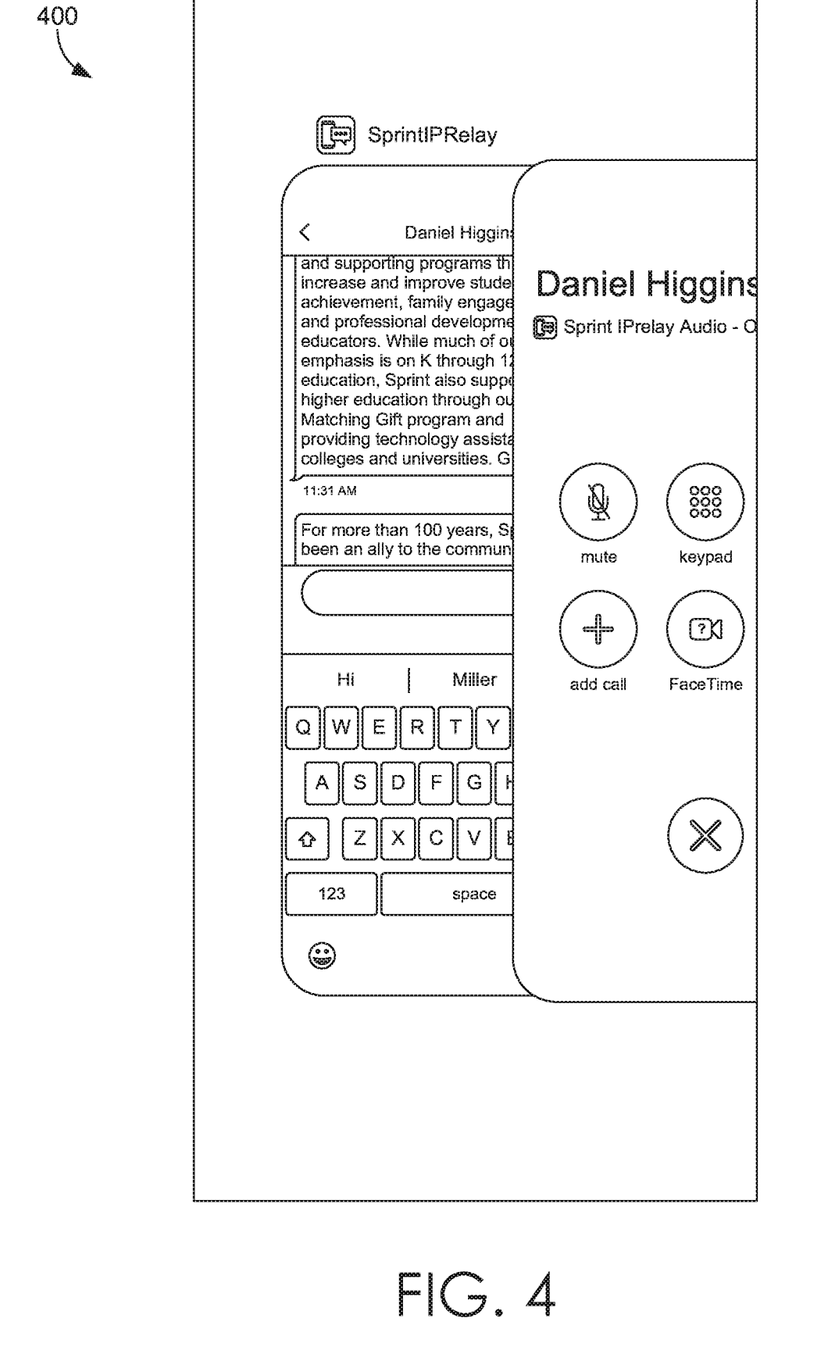

Turning now to FIG. 4, FIG. 4 illustrates a screen shot 400 of an ongoing VoIP session simultaneous to the chat session. The VoIP session persists until the chat session has been terminated, even though the VoIP session is not used for communications between the parties. As mentioned, the parties communicate through the chat session, which is established through the relay application, as a voice/audio session is not established through the VoIP session. Aspects herein thus allow the user of the relay application to move between the call interface and the chat session.

Figure 5:
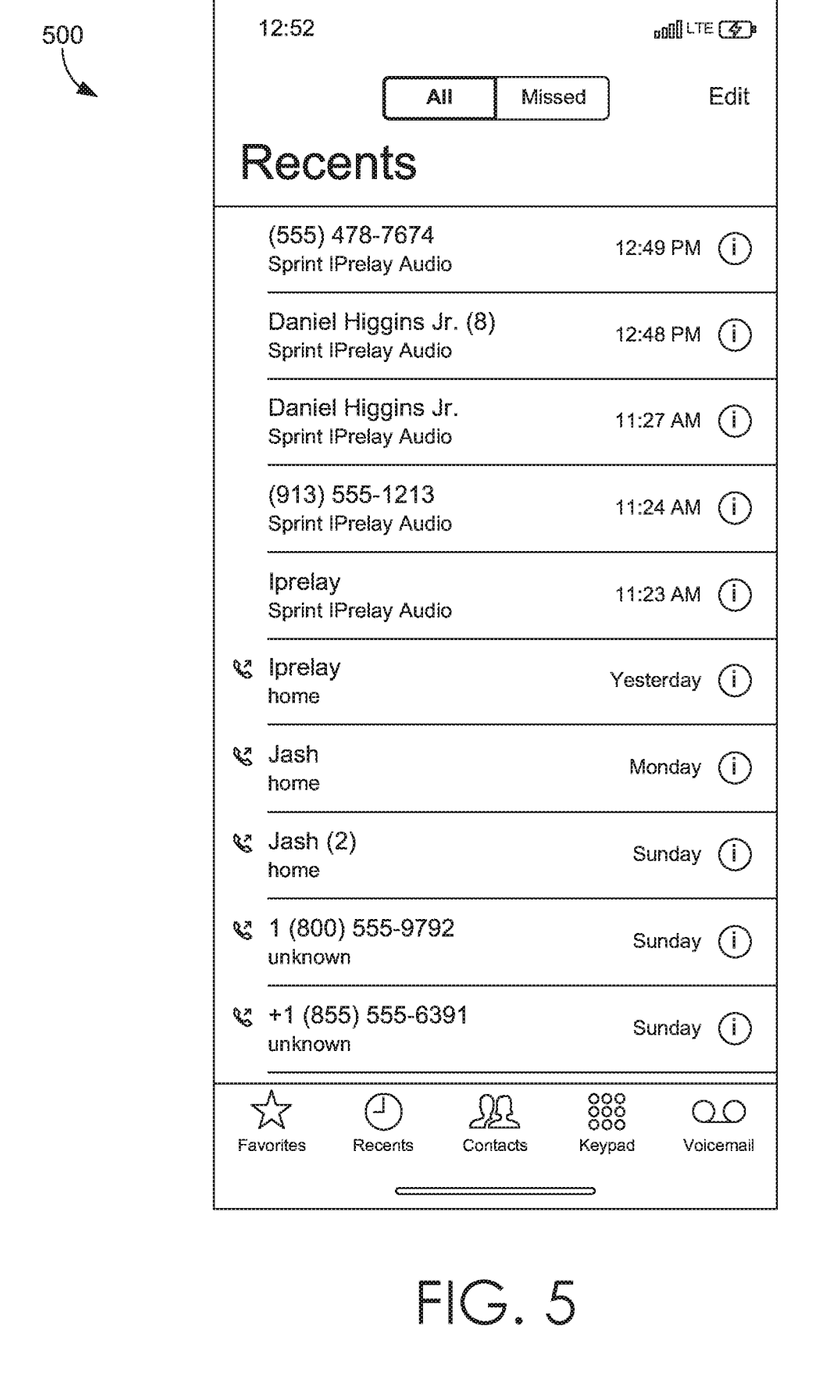

FIG. 5 illustrates a screen shot 500 of an exemplary call log which includes multiple calls to/from another party using a relay application. For example, for a recent call that took place, the call would be identified in this list. It can be included here, as a VoIP session has been established, where otherwise it would not have. Previously, when a relay application was used, the call, such as a missed call, may have been shown in a notification center where notifications from other applications are displayed. However, since a VoIP session is established, the call actually shows as a missed call in the device's call log.

Figure 6:
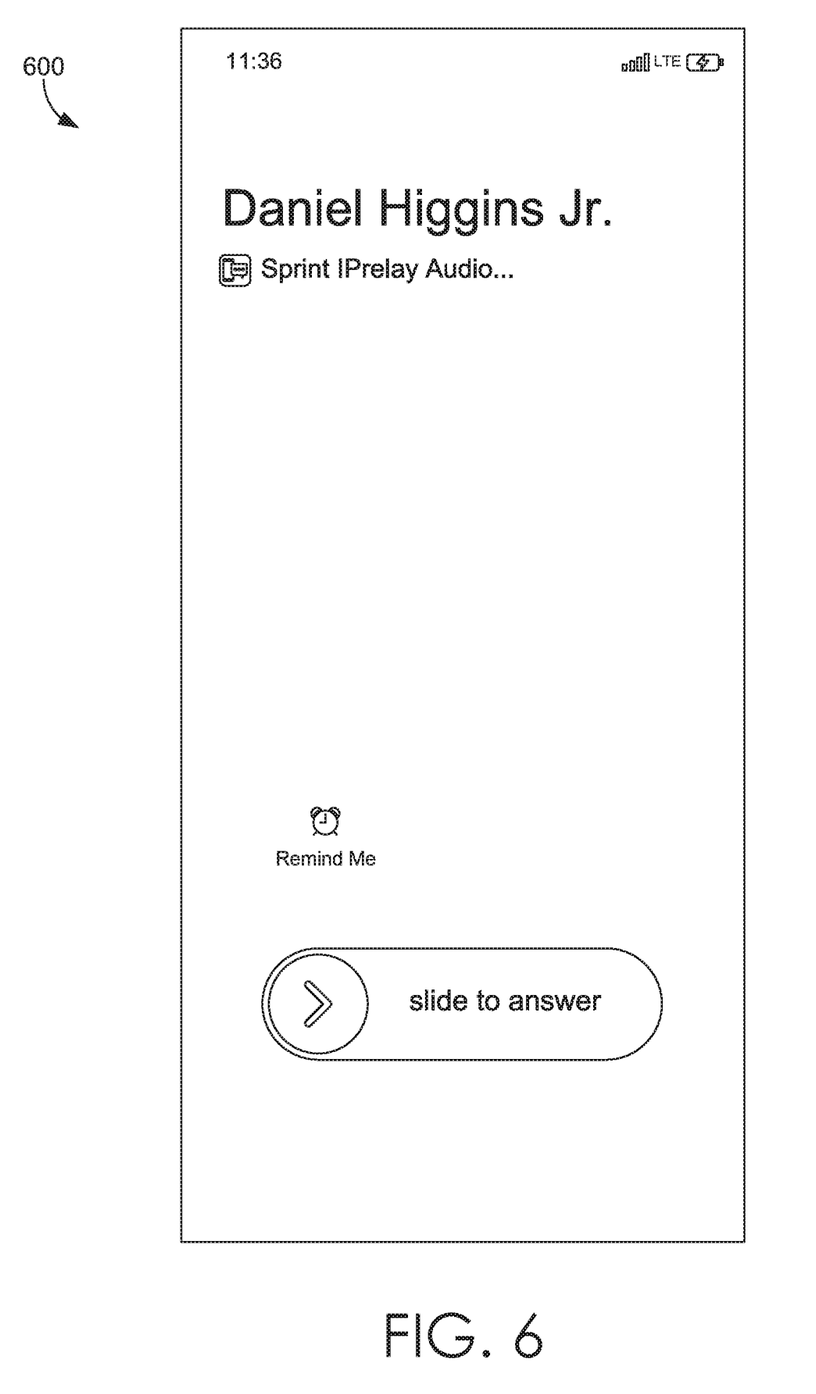

FIG. 6 illustrates a screen shot 600 of an exemplary incoming call notification, which may be displayed when the user's device is locked. The rationale for how the enhanced call notification is displayed on the user's device is the same as in FIG. 2, which, in short, is that a VoIP session is established, even though it isn't used for the actual communications between the users.

Figure 7:
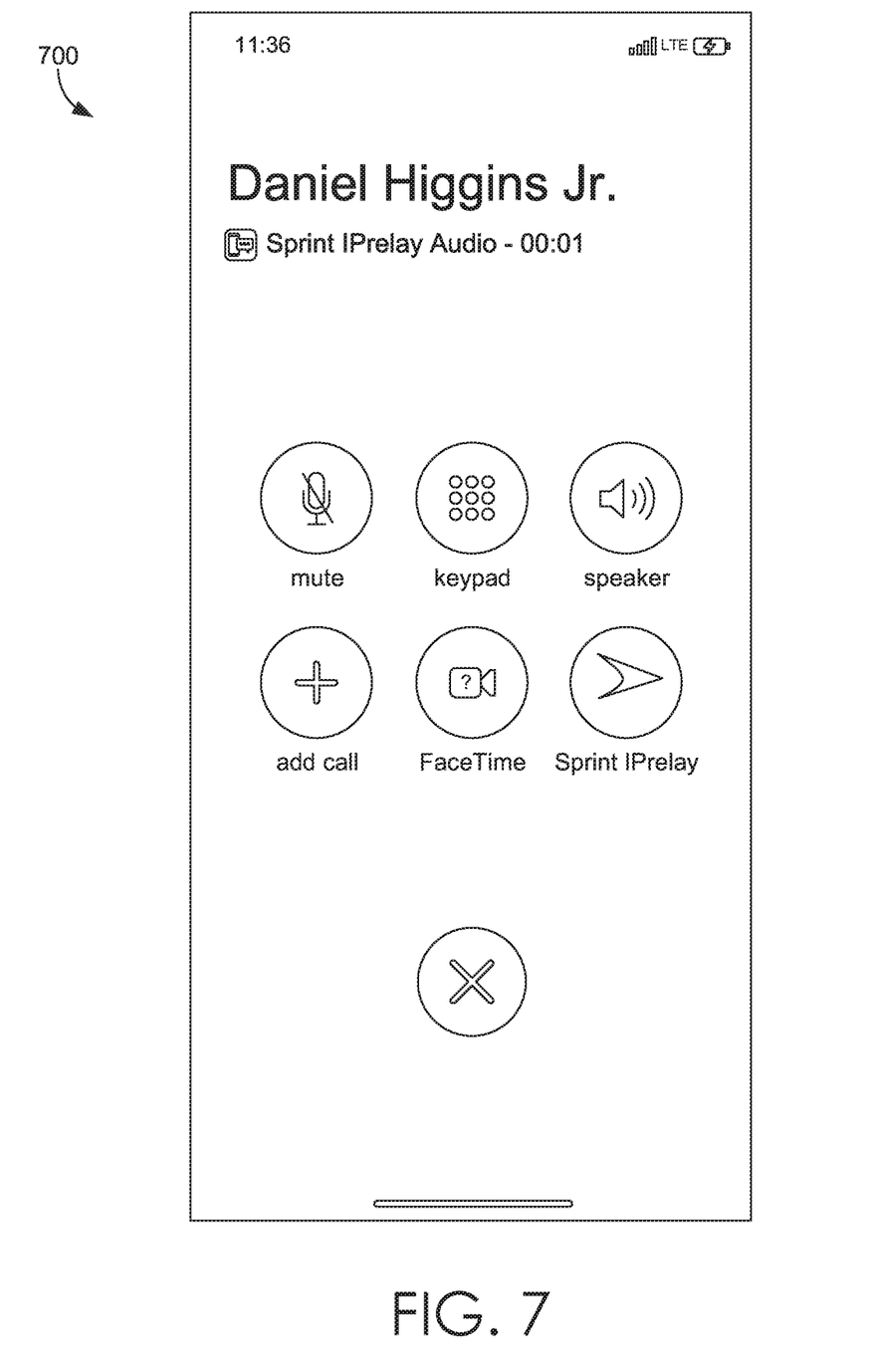

Referring to FIG. 7, FIG. 7 illustrates a screen shot 700 of an interface as a call is taking place. Again, the "call," once the VoIP session is established, is a chat session between the parties within the relay application, whether one or more of the parties communicates via speech/voice, text using a keyboard of a device, a keyboard that accepts braille inputs, and outputs braille, etc. Although the VoIP session persists until the chat session is terminated, the VoIP session does not include a voice/audio session, and thus is not substantively used for communications between the parties.

Figure 8:
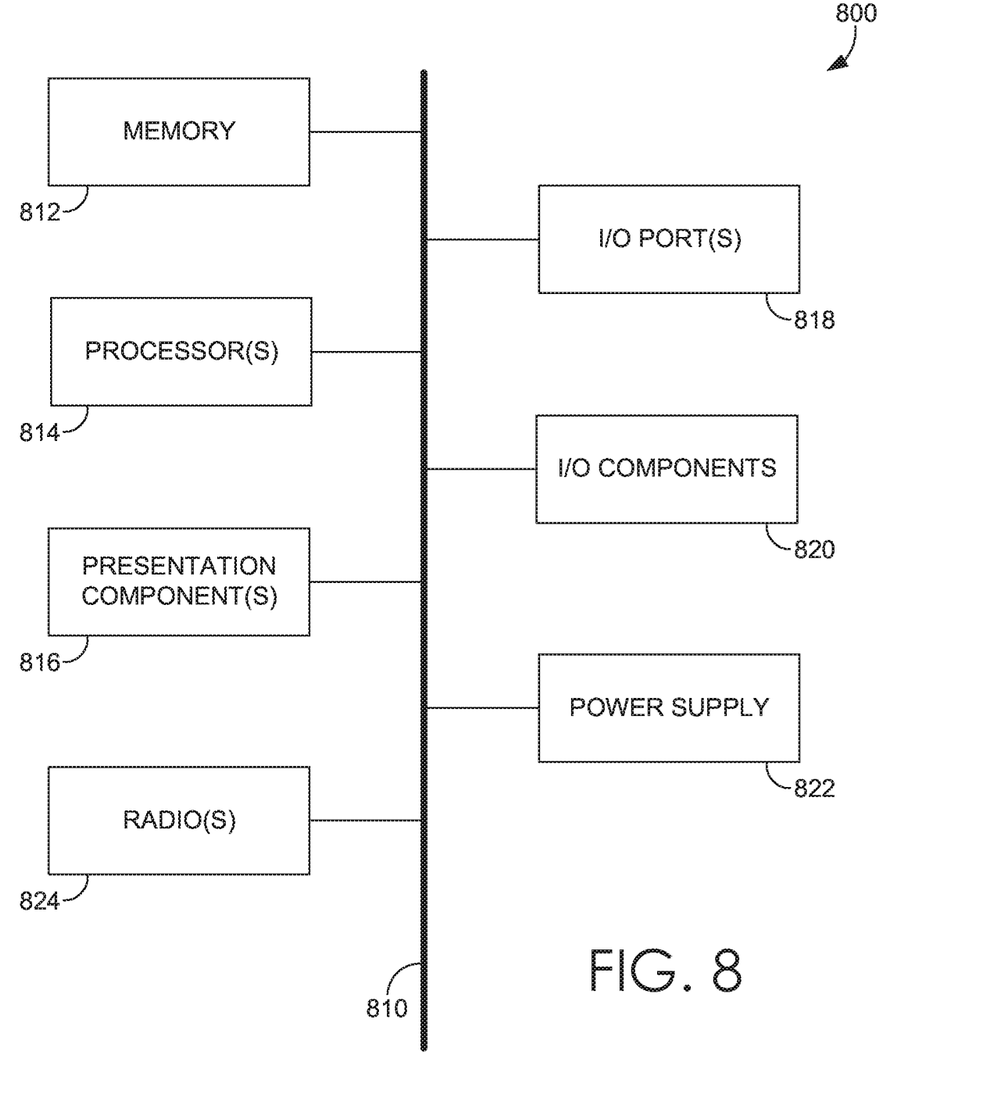
FIG. 8 depicts an exemplary computing environment suitable for use in implementation of the present disclosure.

Referring to FIG. 8, a diagram is depicted of an exemplary computing environment suitable for use in implementations of the present disclosure. In particular, the exemplary computer environment is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, computing device 800 includes bus 802 that directly or indirectly couples the following devices: memory 804, one or more processors 806, one or more presentation components 808, input/output (I/O) ports 810, I/O components 812, and power supply 814. Bus 802 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component such as a display device to be one of I/O components 812. Also, processors, such as one or more processors 806, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 804 includes computer-storage media in the form of volatile and/or nonvolatile memory. Memory 804 may be removable, nonremovable, or a combination thereof. Exemplary memory includes solid-state memory, hard drives, optical-disc drives, etc. Computing device 800 includes one or more processors 806 that read data from various entities such as bus 802, memory 804 or I/O components 812. One or more presentation components 808 presents data indications to a person or other device. Exemplary one or more presentation components 808 include a display device, speaker, printing component, vibrating component, etc. I/O ports 810 allow computing device 800 to be logically coupled to other devices including I/O components 812, some of which may be built in computing device 800. Illustrative I/O components 812 include a microphone, joystick, game pad, satellite dish, scanner, printer, wireless device, etc.

Radio 816 represents a radio that facilitates communication with a wireless telecommunications network. Illustrative wireless telecommunications technologies include CDMA, GPRS, TDMA, GSM, and the like. Radio 816 might additionally or alternatively facilitate other types of wireless communications including Wi-Fi, WiMAX, LTE, or other VoIP communications. As can be appreciated, in various embodiments, radio 816 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more computer memory having computer-executable instructions embodied thereon that, when executed, perform a method for enhancing notifications associated with an incoming call, the method comprising:
    receiving, from an intermediate party, an indication that a calling party is attempting to initiate an incoming call intended for a receiving party that utilizes a relay application;
    establishing a chat session between the intermediate party and the calling party utilizing the relay application;

establishing a Voice over Internet Protocol (VoIP) session between the calling party and the receiving party, wherein the VoIP session does not include a voice session, persisting the VoIP session until the chat session is terminated; and causing an identification of the incoming call to be placed in a call log of a user device associated with the receiving party, wherein the identification of the incoming call is placed in the call log of the user device associated with the receiving party through the VoIP session.

2. The one or more computer memory of claim 1, wherein the intermediate party is associated with a wireless communications network.

3. The one or more computer memory of claim 1, wherein a priority notification system is utilized to provide the indication that the calling party is attempting to initiate the incoming call in real-time or near real-time.

4. The one or more computer memory of claim 3, wherein the priority notification system is associated with an operating system of the user device associated with the receiving party.

5. The one or more computer memory of claim 1, further comprising causing a notification to be displayed on the user device associated with the receiving party, the notification allowing the receiving party to accept or decline the incoming call.

6. The one or more computer memory of claim 1, wherein the VoIP session is established prior to the receiving party accepting or declining the incoming call.

7. The one or more computer-readable media of claim 1, wherein the chat session does not utilize VoIP.

8. The one or more computer memory of claim 1, wherein the identification of the incoming call is placed in the call log of a user device associated with the receiving party after the incoming call has been terminated.

9. The one or more computer memory of claim 1, wherein the VoIP session is established subsequent to the receiving party accepting the incoming call.

10. A method for enhancing notifications associated with an incoming call, the method comprising:
receiving, at an intermediate party, an indication that a calling party is attempting to call a receiving party that utilizes a relay application;
subsequent to receiving the indication, establishing a chat session using the relay application;
establishing a VoIP session between the calling party and the receiving party, wherein the VoIP session does not include a voice session, and wherein the chat session is established using the relay application;
persisting the VoIP session until the chat session is terminated; and
causing an identification of the incoming call to be placed in a call log of a user device associated with the receiving party through the VoIP session.

11. The method of claim 10, further comprising receiving an indication that the receiving party has accepted the incoming call associated with the chat session and the VoIP session.

12. The method of claim 11, further comprising receiving an indication that the chat session has been terminated and terminating the VoIP session.

13. The method of claim 11, wherein the VoIP session is established subsequent to the receiving party accepting the incoming call.

14. The method of claim 10, wherein a priority notification system associated with an operating system of the user device associated with the receiving party is utilized to provide an indication of the incoming call to the receiving party in real-time or near real-time.

15. The method of claim 10, wherein the identification of the incoming call is placed in the call log of the user device associated with the receiving party after the incoming call has been terminated.

16. The method of claim 10, further comprising receiving an indication that the incoming call has been declined by the receiving party, or that a threshold of time for a notification to appear on a user device associated with the receiving party has expired.

17. The method of claim 16, wherein the identification of the incoming call placed in the call log of the user device associated with the receiving party is a missed call log.

18. A method for enhancing notifications associated with an outgoing call, the method comprising:
receiving, at an intermediate party, an indication that a calling party is attempting to call a receiving party;
establishing a chat session between the calling party and the receiving party through a relay application associated with the intermediate party;
establishing a VoIP session between the calling party and the receiving party, wherein the VoIP session does not include a voice session;
persisting the VoIP session until the chat session is terminated; and
causing an identification of the outgoing call to be placed on a call log of a user device associated with the calling party, wherein the identification of the outgoing call is placed through the VoIP session.

19. The method of claim 18, further comprising receiving an indication that the outgoing call from the calling party has been accepted by the receiving party.

20. The method of claim 18, further comprising receiving an indication that the outgoing call has been declined by the receiving party, or that a threshold of time for a notification to appear on a user device associated with the receiving party has expired; and
disconnecting the chat session between the calling party and the receiving party.

* * * * *